US006845502B1

(12) United States Patent
Baumgart et al.

(10) Patent No.: US 6,845,502 B1
(45) Date of Patent: *Jan. 18, 2005

(54) EXTENDED ATTRIBUTE INFORMATION RETENTION FILE FORMAT FOR OBJECT FILES

(75) Inventors: Leona Dryden Baumgart, Los Gatos, CA (US); John Robert Ehrman, Sunnyvale, CA (US); Richard E. Lee, deceased, late of Milipitas, CA (US); by Barbara Ann Lee, legal representative, Milipitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/557,633

(22) Filed: Apr. 25, 2000

(51) Int. Cl.[7] ................................................. G06F 9/44
(52) U.S. Cl. ...................................................... 717/162
(58) Field of Search ................................. 717/107, 110, 717/122, 128, 131, 136, 139, 140, 144–145, 147, 153, 154, 159, 162, 163; 709/230; 703/25

(56) References Cited

U.S. PATENT DOCUMENTS

| 5,303,379 A | 4/1994 | Khoyi et al. ................. 717/166 |
| 5,408,665 A | 4/1995 | Fitzgerald .................... 717/163 |
| 5,553,286 A | 9/1996 | Lee .............................. 717/162 |
| 5,625,822 A | 4/1997 | Brett ............................ 717/145 |
| 5,878,262 A | 3/1999 | Shoumura et al. ........... 717/164 |
| 6,083,276 A | 7/2000 | Davidson et al. ............ 717/107 |
| 6,182,283 B1 | 1/2001 | Thomson ..................... 717/153 |
| 6,185,571 B1 * | 2/2001 | Carter et al. ................. 717/124 |
| 6,185,733 B1 | 2/2001 | Breslau et al. ............... 717/163 |
| 6,366,876 B1 | 4/2002 | Looney ........................ 703/25 |

OTHER PUBLICATIONS

L. Presser, et al., "Linkers and Loaders", 09/72, Computing Surveys, vol. 4, No. 3, pp. 149–167.
IBM Manuel, "High Level Assembler for MVS & VM & VSM", Language Reference MVS and VM, Release 2, Mar. 1995, pp. 131–138.

* cited by examiner

Primary Examiner—Kakali Chaki
Assistant Examiner—Tuan A. Vu
(74) Attorney, Agent, or Firm—David W. Victor; Konrad Raynes & Victor LLP

(57) ABSTRACT

Disclosed is a system, method, and program for producing an executable file for execution by a computer. The computer receives a plurality of programming language statements comprising a source program and translates the source program into an object module. The object module includes a symbol reference, a symbol definition, attribute information for the symbol reference derived from the language, and attribute information for the symbol definition derived from the language statements. The computer binds the object modules into a program object and resolves in the program object an external symbol reference in the object module with an external symbol definition in another object module. The attribute information is available when binding object modules into the program object.

39 Claims, 8 Drawing Sheets

EXTENDED ATTRIBUTE INFORMATION RETENTION FILE FORMAT FOR OBJECT FILES

CROSS-REFERENCE TO RELATED APPLICATION

This application is related to the following co-pending and commonly assigned patent application, filed on the same date herewith, entitled "Extended Syntax Record for Assembler Language Instructions," by Leona Baumgart, John Ehrman, and Dick Lee, application Ser. No. 09/558,430, which application, now issued as U.S. Pat. No. 6,631,516, is incorporated herein by reference in its entirety.

BACKGROUND OF THE INVENTION

1. Field of the Invention

The present invention relates generally to the compiling, loading, and execution of a computer program and, in particular, to the inclusion of descriptive extended attribute information in object modules and load modules concerning the attributes of external symbols and address constants.

2. Description of the Related Art

Programmers write computer programs in high level languages such as assembler language, COBOL, FORTRAN, C, C++, etc. A group of statements written in a language is referred to as a source module. Before the source module can be executed, the source statements within the source module must be transformed to machine readable executable code.

An assembler or compiler, referred to herein as a source translator, translates the source module into an object module, which includes machine readable executable code, data, external symbols, address constants, and further bookkeeping information used in the process of transforming the object module into an executable file. A linkage editor combines one more object modules into a load module in preparation for execution. If one object module includes a reference to an external symbol defined in another object module, then the linkage editor may resolve this reference to the definition in the load module.

Often, the source translator disregards descriptive information included in the source module when generating the object module. As a result, object modules and load modules often include little or no information on the attributes of definition and declaration of symbols. Furthermore, in the prior art, assembler language instructions, such as the ENTRY, CSECT, EXTRN, and DC instructions in the International Business Machines Corporation ("IBM") High Level Assembler for MVS, VM, and VSE ("IBM High Level Assembler") do not include descriptive information on the attributes of the symbols used as operands in the assembler language instructions. These and other specific aspects of assembler language discussed herein are described in the publication "High Level Assembler for MVS & VM & VSE, Language Reference for MVS and VM," Release 2, Document Number SC26-4940-01, IBM Corporation, which publication is incorporated by reference herein.

Generally, the source module and object modules include one or more control sections. A control section is the smallest subdivision of a program that can be relocated as a unit. At coding time, the programmer creates control sections in the source modules, establishes the addressability of each control section, and establishes symbolic linkages between control sections that lie in different source modules. The programmer establishes symbolic linkages by declaring an external symbol in one source module to reference a control section or a point defined within another object module. Source modules external to the module in which the external symbol is defined can reference the text in the location identified by the external symbol. In this way, the external symbol is the vehicle used for establishing symbolic linkages between programs.

In the IBM High Level Assembler language, the programmer can use the ENTRY, CSECT, DXD, RSECT, and START instructions to define external symbols in the source module. The ENTRY instruction defines the external symbol as the location where the symbol is placed. For instance, the instruction ENTRY B defines the external symbol B as a point within the control section where the instruction named B is placed.

The CSECT instruction identifies a control section with an external symbol. For instance, the instruction B CSECT names the following control section B, thereby allowing external source modules to reference the control section identified by the external symbol B. The programmer can declare external symbols in a source module that are not defined in that module using the EXTRN instruction. A declared symbol can be used in instruction operands within that source module.

Symbols can have two types of attributes, inherent (or implicit or intrinsic) and extended (descriptive). Inherent attributes are attributes that are typically part of a fixed set of properties associated with an external symbol. Examples of inherent attributes of a symbol include: addressing mode (AMODE, which implicitly designates the symbol as naming executable code); and residency mode (RMODE, which implicitly designates a region of storage where the object named by the symbol must reside). Descriptive or extended attributes are additional information either derived from the program's language statements or provided by other means. Examples of descriptive attributes include: whether an external symbol reference is to data (and what data types and structures) or to executable code (and what numbers and types of arguments are being passed); whether an external symbol definition is for data (and what data types and structures) or for executable code (and what expected number and types of arguments are to be received).

One of the shortcomings of current methods for using external symbols is that the instructions identifying the symbols do not retain descriptive attribute information on the definition and declaration of the symbols. Current methods provide only minimal support for external symbol attributes, and include no mechanism for providing information on what the symbols name, and any interesting or useful "properties" of the symbols. Further, almost all attribute information is inherent, often by default. This lack of information makes it difficult for the programmer to debug incompatibility errors that arise if the instruction declaring the symbol (e.g., EXTRN) is incompatible with the instruction defining that symbol (e.g., ENTRY or CSECT).

For example, if the external symbol is defined as naming a location having code, but the reference to the symbol expects data, then an incompatibility error may arise. An incompatibility error may also arise if the reference is compatible with only 24-bit addressing and the symbol is defined as using only 31-bit addressing. These incompatibility errors could prevent the program from properly executing. In present techniques for generating object and load modules, there is no way to associate extended descriptive information with a symbol.

Similarly, a program may need to declare multiple sets of attributes to be associated with a given external symbol. To illustrate, suppose a source program A contains multiple calls to an external entry point B:

Call B(1, 2)

Call B(3.14, 'ABC', 6)

where the number and types of argument vary from call to call. Because address constants in module A are used to provide the address of the external symbol B, specific extended attributes for each call may be associated with the address constant used for that call.

There is thus a need in the art for providing improved methods and data structures for providing attribute information with symbols and address constants.

SUMMARY OF THE INVENTION

To overcome the limitations in the prior art described above, preferred embodiments disclose a system, method, and program for producing an executable file for execution by a computer. The computer receives a plurality of programming language statements comprising a source program and translates the source program into an object module. The object module includes a symbol reference, a symbol definition, attribute information for the symbol reference derived from the language statements, and attribute information for the symbol definition derived from the language statements. The computer binds the object modules into a program object and resolves in the program object an external symbol reference in the object module with an external symbol definition in another object module. The attribute information is available when binding object modules into the program object.

In further embodiments, the object module is capable of including an address constant for a symbol referenced in the module and attribute information derived from the language statements for the address constant.

In still further embodiments, the object module includes an External Symbol Directory (ESD) having records capable of indicating a symbol in the program, a location of the symbol in the program, and a pointer to attribute information in the program for the symbol.

Further, the object module includes a Relocation List Directory (RLD) having records capable of indicating the location of the referenced symbol, a location of an address constant for the referenced symbol in the program, and a pointer to attribute information for the address constant in the program.

Preferred embodiments provide a mechanism through programming language statements to provide descriptive information in the object modules and load modules for symbol references and definitions, address constants, procedure calls, and other actions of the program relating to external symbols. Further, the descriptive attribute information may describe attributes of the external symbols, of address constants and of the parameters of procedure calls and the symbols and text they reference. This descriptive attribute information may be used to determine the compatibility of references and definitions between symbols, address constants, etc. This descriptive information may further be used to diagnose and correct any such incompatibility errors that may exist.

DETAILED DESCRIPTION OF PREFERRED EMBODIMENTS

In the following description, reference is made to the accompanying drawings which form a part hereof, and in which is shown by way of illustration embodiments of the invention. It is understood that other embodiments may be utilized and structural, functional, and operational changes may be made without departing from the scope of the present invention.

Hardware and Software Environment

Figure 1:
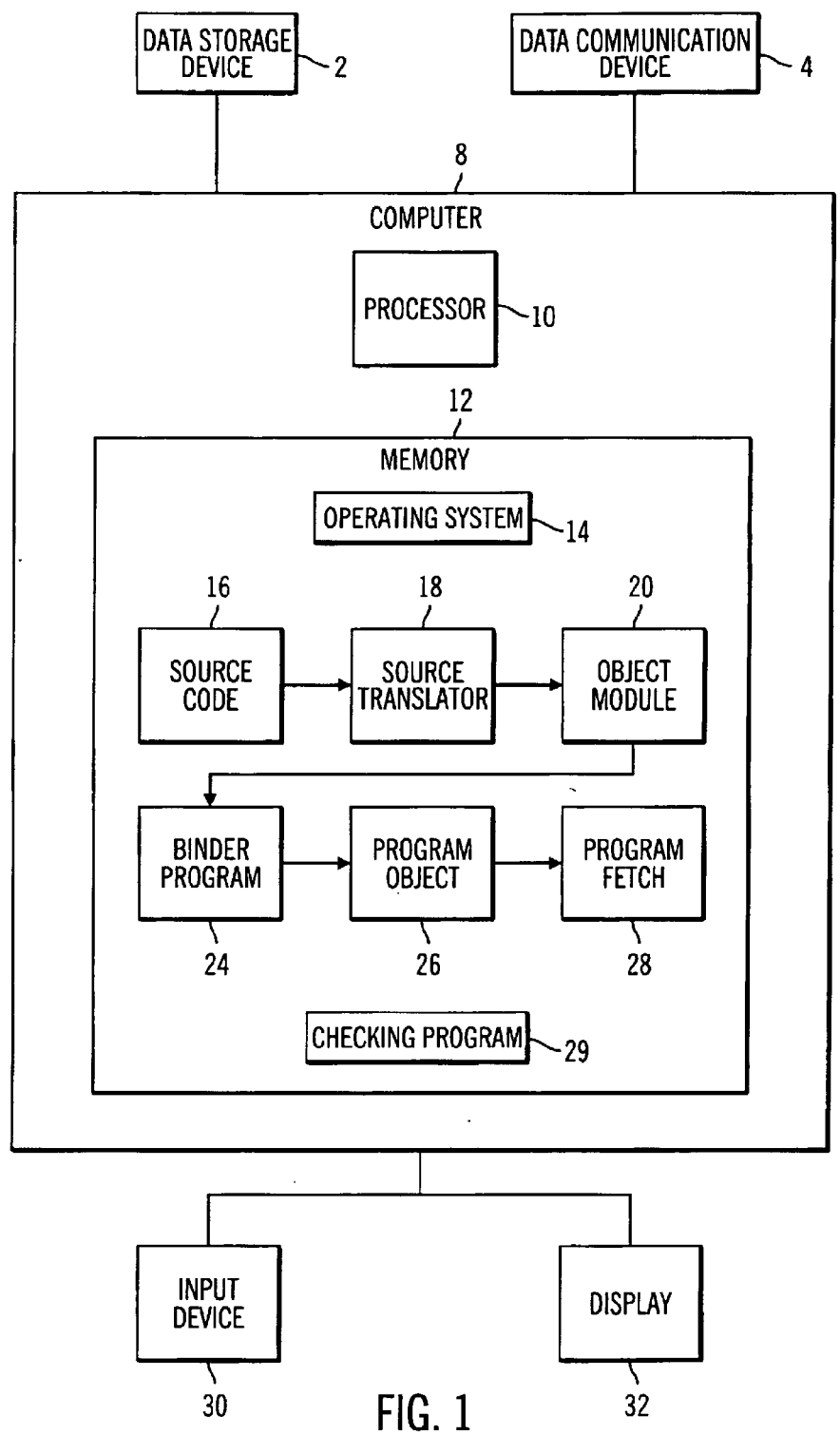
FIG. 1 is a block diagram illustrating an exemplary hardware and software environment in which preferred embodiments are implemented.

FIG. 1 is a block diagram illustrating an exemplary hardware environment used to implement the preferred embodiments of the present invention. In the exemplary hardware environment, a computer 8 may include, inter alia, a processor 10, memory 12 (e.g., random access memory (RAM)), an input device 30 (e.g., keyboard, mouse pointing device, voice activated input device, etc.), display 32 (e.g., CRT, LCD displays, etc.), as well as a data storage device 2 (e.g., hard, floppy, and/or CD-ROM disk drives, etc.), and/or data communication device 4 (e.g. modems, network interfaces, etc.). It is envisioned that attached to the computer 8 may be other devices such as a read only memory (ROM), a video card, bus interface, printers, etc. Those skilled in the art will recognize that any combination of the above components, or any number of different components, peripherals, and other devices known in the art, may be used with the computer 8.

The computer 8 operates under the control of an operating system (OS) 14, such as OS/390, MVS, VM, VSE, OS/2, AIX, UNIX, WINDOWS, MACINTOSH,** etc. The operating system 14 is booted into the memory 12 of the computer 8 for execution when the computer 8 is powered-on or reset. In turn, the operating system 14 then controls the execution of one or more computer programs, including a source translator 18, binder program 24, a program fetch 28 program, and a checking program 29. These programs 18, 24, 28, and 29 process a source module 16, an object module 20, and a program object 26 to generate a final executable file which is loaded into memory. The present invention is generally implemented in these data objects 20 and 26, and in these computer programs 18, 24, 28, and 29 which execute under the control of the operating system 14 and cause the computer 8 to perform the desired functions as described herein. Alternatively, the present invention may be implemented in the operating system 14 itself.

The source translator 18 program, which usually is a compiler or assembler, analyzes the source module 16 loaded into the memory 12. The source module 16 is generally stored in a text file on the data storage device 2, and/or entered interactively by a programmer from the input device 30. The source translator 18 synthesizes an object module 20 from the source module 16. The binder program 24 receives as input one or more object modules 20 or a combination of object modules 20 and program objects 26, and produces a program object 26 as output. The program fetch 28 loads the executable text from the program object 26 into memory 12 for execution by the processor 10. This process of binding and loading text into memory is described in detail in "Linkers and Loaders," by Leon Presser and John R. White, ACM Computing Surveys, Vol. 4, No. 32, September 1972, pp. 149–167, which is incorporated herein by reference in its entirety.

The operating system 14, source module 16, source translator 18, object module 20, binder program 24, program object 26, program fetch 28, and checking program 29 are all comprised of instructions which, when read and executed by the computer 8, cause the computer 8 to perform the steps necessary to implement and/or use the present invention. Generally, the operating system 14, source module 16, source translator 18, object module 20, binder program 24, program object 26, program fetch 28, and checking program 29 are all tangibly embodied in and/or readable from a device, carrier or media, such as memory 12, data storage device 2, and or data communications device 4. Under control of the operating system 14, the programs 18, 16, 20, 24, 26, 28, and 29 may be loaded from memory 12, data storage device 2 and/or data communications device 4 into the memory 12 of the computer 8 for use during actual operations. The term program as used herein refers to human readable source code as well as machine readable code.

Those skilled in the art will recognize that the exemplary environment illustrated in FIG. 1 is not intended to limit the present invention. Indeed, those skilled in the art will recognize that other alternative hardware environments and programs may be used without departing from the scope of the present invention.

The Object Module

Figure 2:
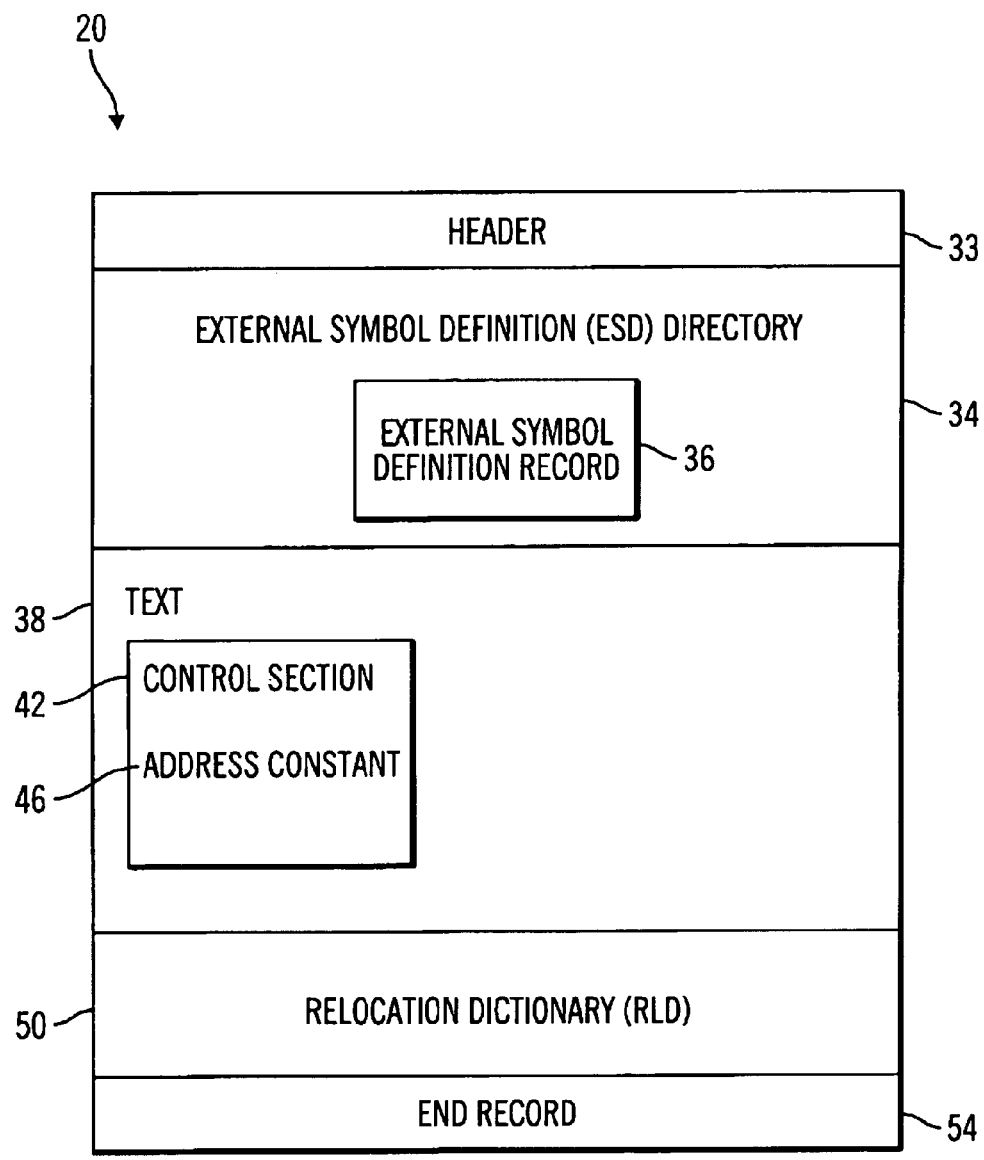
FIG. 2 is a block diagram of an object module in accordance with preferred embodiments of the present invention.

As discussed, the source translator 18 translates the source module 16, which can include assembler language instructions, into object module 20. FIG. 2 shows a preferred embodiment of the records in an object module 20, including an external symbol directory (ESD) 34, one or more control sections 42, and one or more address constants 46.

The external symbol directory (ESD) 34 includes an external symbol definition record (ESD) 36 for each symbol definition or reference declared in the object module 20. During binding of an object module 20 with one or more object modules 20 or program objects 26, the binder program 24 creates a combined external symbol directory (CESD) within the resulting program object 26 which includes the external symbols from those object modules and program objects included in the binding.

During binding, an external reference is said to be resolved if one object module 20 or program object 26 involved in the binding includes a reference to a symbol (a reference declaration), and another object module 20 or program object 26 involved in the binding defines that symbol (the definition declaration). The combined external symbol directory (CESD) includes just one entry for the definition of an external symbol. All references to the symbol in the combined program object 26 now reference this definition. When an external reference is resolved, the value of the external symbol referenced by an address constant can be relocated into the location of the address constant.

If an external symbol referenced in an object module 20 or program object 26 is not resolved with the definition of that symbol, then the external symbol directory 34 retains the external symbol as an unresolved external reference. Typically, all external references must be resolved before the program object 26 can be executed. This may be accomplished by referring to a call library containing definitions for external references.

Each object module 20 includes at least one control section (CSECT) 42. As discussed, a control section 42 is a unit of text that is the basic indivisible unit of linking and data manipulation. Although all elements of a single control section 42 are loaded and executed in a constant relationship with each other, an individual control section can be relocated independently of other control sections at load time without altering the operating logic of the program. As discussed, the CSECT instruction is used to provide an external symbol name to a control section 42.

The object module 20 may also include an address constant 46 in a control section 42 which defines a location within the text whose value is usually not known after translation of the source module 16. In the IBM High Level Assembler language, an address constant 46 is defined with a DC instruction, wherein the DC instruction is also used to define data constants. Address constants 46 can be relocated to contain the addresses of data and code. The location of the address constant 46 in the text is where the value of the referenced symbol will be relocated. The value of the item represented by the symbol is relocated into the address constant 46 during or before program execution.

The relocation directory 50 within the object module 20 includes one entry for each address constant 46. The relocation directory 50 includes a relocation pointer (R) which points to the external reference symbol the address constant references. Also included is a position pointer (P) which points to the external symbol definition entry in the external symbol definition (ESD) directory 34 for the control section 42 which includes the address constant 46 at issue.

It should be appreciated that in alternative embodiments, different data structures and formats may be used for the format of the object module 20. Moreover, alternative embodiments of the object module 20 structure may be able to accommodate different types of procedures which reference symbols or text in other object modules 20 or program objects 26, in addition to the external symbol and address constants discussed above.

Extended Attribute Data Structure

Preferred embodiments provide commands to allow a user to declare inherent and descriptive attributes for symbol definitions and references, and for address constants. The "XATTR" assembly language statement may be used to declare attributes for a symbol as shown in language statement (1):

symbol XATTR attributes (1)

One or more inherent attribute operands are permitted. For example, the statement:

AA XATTR SCOPE(EXPORT), EXECUTABLE declares that AA has export scope and refers to code. Various other attribute operands may also be utilized to declare that a symbol includes various other attributes, such as being directly or indirectly referenced, unknown, code, data, etc. The binder 24 could use this information to flag possible incompatible reference-definition combinations.

Descriptive declarations, defined elsewhere in the object, may also be used. The following language statement (2) may be used to support declaring descriptive attributes:

symbol XATTR ATTRIBUTES(label) (2)

where "label" is a symbol (internal or external) known in the declaring program. "Label" names the location of the extended attribute information to be associated with the declared symbol. The data named by "label" may be defined as ordinary text, integers, character strings, bit flags, etc. Below is an example of language statements using the "Label" to indirectly declare attributes for the external symbol BB.

| BB      | XATTR Attributes(BB_Attr) |
|---------|---------------------------|
| BB_Attr | DC .....attribute data.... |

The above statement declares attribute data named BB_Attr for the symbol BB. Further, attributes may be categorized as fixed and extended. Fixed attributes may include properties assigned by the translator, such as addressing mode (AMODE) and residency mode (RMODE). Extended attributes may be defined by the user, such as defining properties of a CALL or ENTRY interface. Both types of attributes may be associated with a symbol.

Preferred embodiments also provide a mechanism to declare attributes for each reference to a symbol using an address constant. In this way, attributes are assigned to each address constant in the module indicating attributes of the referenced symbol relocated into the address constant. Below is an example of a language statement used to define both fixed and extended attributed information to an address constant named DD:

DD DC A(symbol(ATTRIBUTES(label), LINKAGE(OS)))

The above statement declares attribute information for the address constant DD, which is used to relocate the reference to the symbol. The declared attribute information includes extended attributes defined at the location of "label" and the fixed attribute LINKAGE(OS) indicating that the target should accept OS linkage. While the above examples illustrate explicit declaration of a symbol's fixed and extended attributes, other translators 18 may derive such attribute information implicitly from the statements of the source program 16, without recourse to explicit declaration statements.

Figure 3:
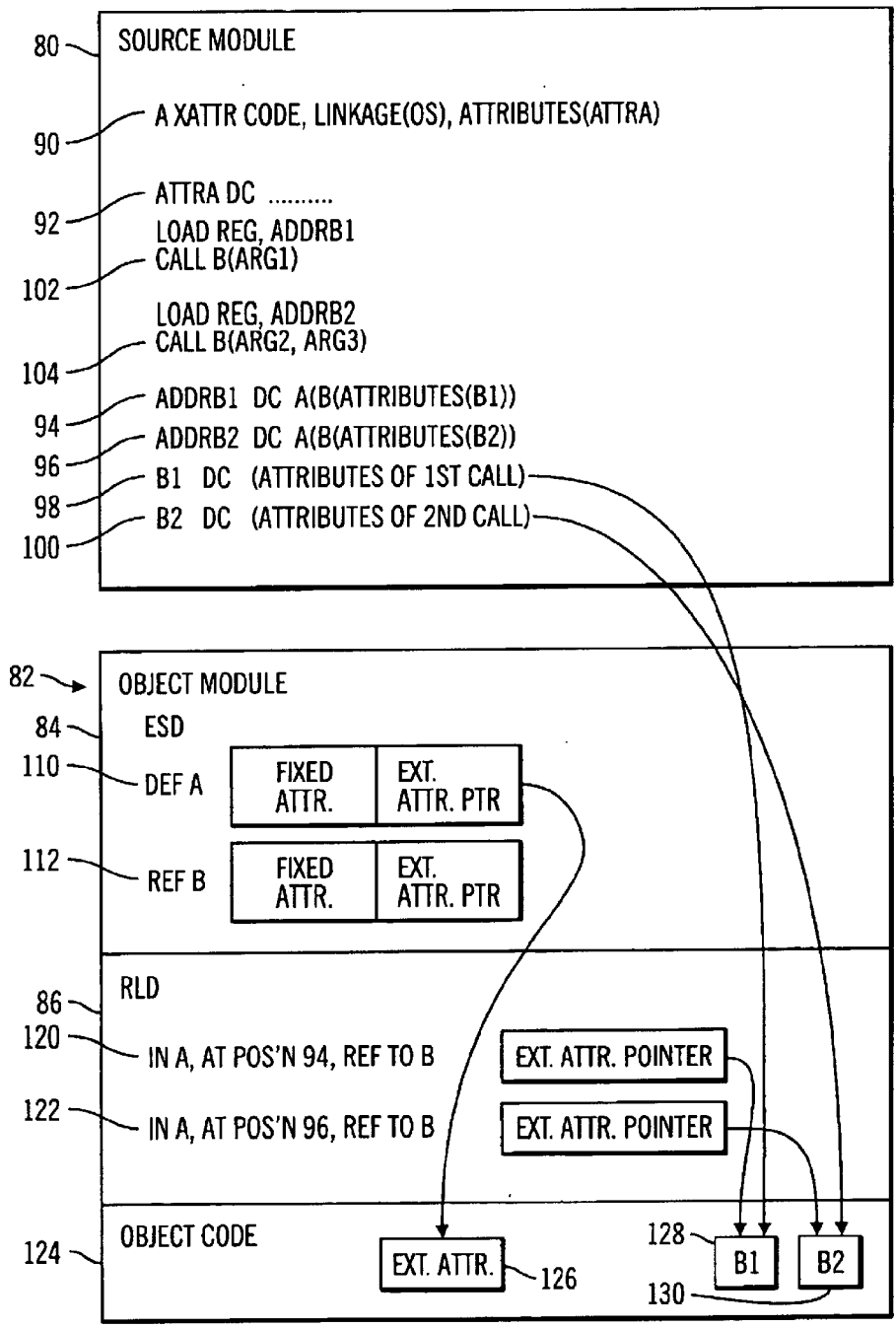
FIG. 3 is a block diagram of source and object modules in accordance with preferred embodiments of the present invention.

FIG. 3 illustrates an example program 80 including language statements to declare extended attributes for address constants and external symbols in accordance with preferred embodiments. The object module 82 includes an External Symbol Directory (ESD) 84, and a Relocation List Directory (RLD) 86. The program 80 includes a language statement 90 using the XATTR command to declare extended attributes named by label AttrA for the symbol definition A. The attributes named by label AttrA are defined at the language statement 92 in the program 80. The program 80 further includes two references or calls 102, 104 to external symbol B. The address constants 94, 96 are used to separately relocate references to the external symbol B. Extended attribute information is declared for each of the two address constants in the language statements 94, 96. The extended attribute information for the address constants 94, 96 is declared indirectly using the statements 98, 100 to define the extended attributes B1 and B2. In this way, different attribute information is declared for each call or reference to symbol B in the call statements 102 and 104. Symbol B is called with different parameters in the separate calls. Providing different attribute information with each call tailors the attribute information to the nature of the call. This provides for independent checking that is sensitive to how the symbol is referenced in different contexts. These two different calls 102, 104 using the address constants 94, 96, will be resolved at binding and load time to the same address. The first call 102 uses the address constant 94 and the second call 104 uses address constant 96.

The ESD 84 portion of the object module 82 includes two records 10 and 112 to provide the location in the program 80 of the definition of A and the reference to B, respectively. Preferred embodiments include pointers in the ESD records to the location of attribute information in the object code 124 for the symbols described in the ESD 84. There are two fields, one for the fixed attribute information or for a pointer to it, for the symbol and the other for a pointer to the extended attribute information for the symbol. The fixed attributes may be encoded directly into a field in the ESD record 84 or they may be encoded in the object code 124. For instance, the extended attribute information pointer for the symbol definition A points to the encoded attribute information 126 derived from the language statement. Similarly, the extended attributes B1 128 and B2 130 encoded in the object code 124 are derived from the language statements for B1 198 and B2 100 in the source module 80. The extended attributes 126 in the object code 124 also include the coding of the extended attributes derived from language statements 92 in the source module.

Figure 4:
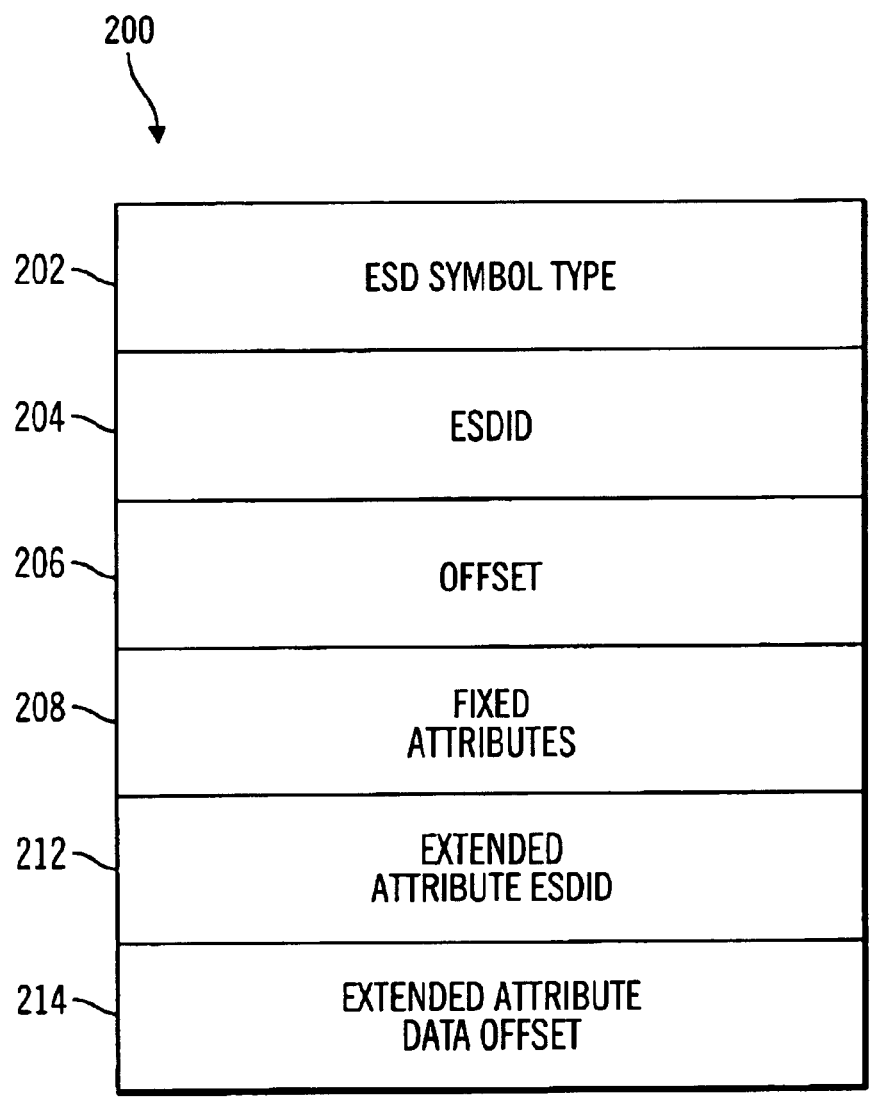
FIG. 4 is a block diagram of an External Symbol Directory (ESD) record in accordance with preferred embodiments of the present invention.

FIG. 4 provides a preferred embodiment of a record 200 for each symbol entry in the ESD 84, providing information on the location of the symbol and fixed and extended attribute information in the program 80. The ESD record 200 includes an ESD symbol type indicator 202 describing the type of symbol, an ESDID 204 which is the identification number for the symbol in the program 80 and (for symbols defined in the program) an offset 206 providing the offset of the symbol in the program 80. The Fixed Attribute 208 and Extended Attribute ESDID 212 identify the fixed and extended attribute information, respectively, in the program 80. The extended attribute offset 214 provides the offset within the program identified by the ESDID where the attribute information is located. The binder program 24 can use the ESDID numbers 204 and 212 to locate a symbol and associated extended attribute data within the object module 82.

With reference to FIG. 3, the RLD 86 includes entries 120, 122 for address constants located in the program 80. These entries indicate the location in the program 80 of the address constants 94, 96 which are used to relocate references to external symbol B into the program 80. Preferred embodiments further provide extended attribute pointer information 120, 122 to point to the declaration 98, 100 of attribute information for the address constants 94, 96 in the program 80 at 98 and 100, and encoded in the object module 82 at 128 and 130, where extended attribute information is associated with each address constant to provide call specific attribute information. Fixed attribute information pointers may also be provided if fixed attribute information is provided with an address constant.

Figure 5:
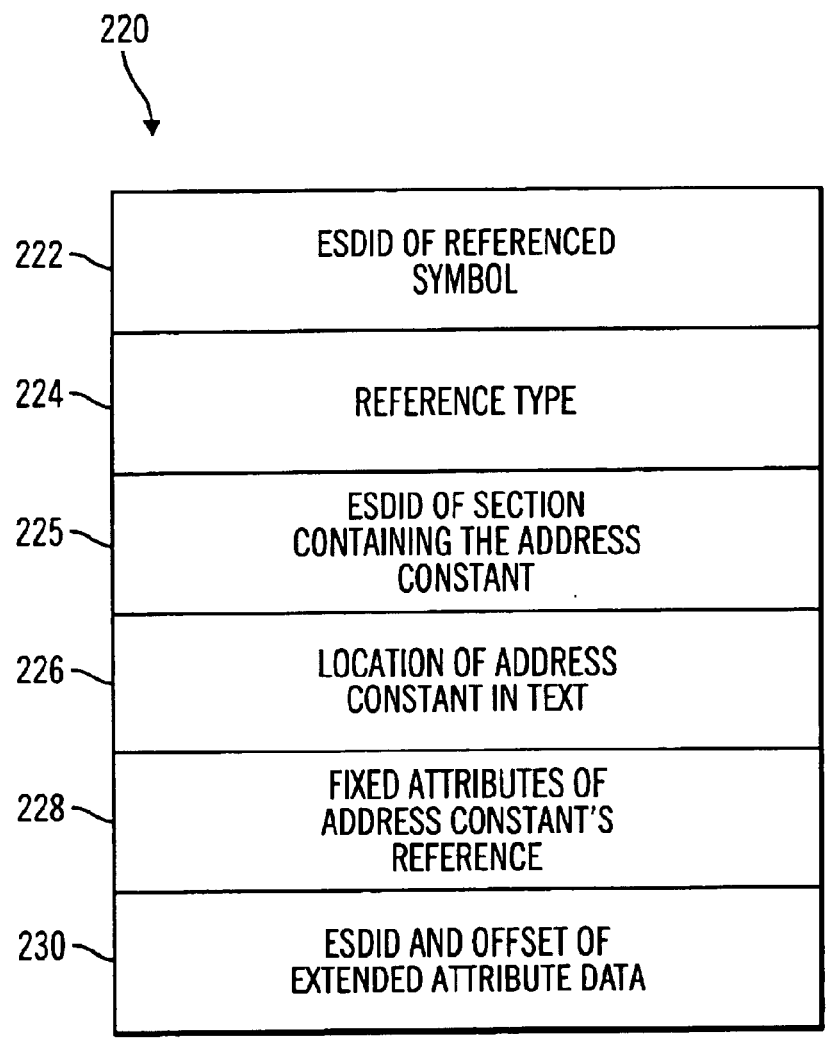
FIG. 5 is a block diagram of a Relocation List Directory (RLD) in accordance with preferred embodiments of the present invention.

FIG. 5 illustrates a record 220 in the RLD 86 to provide information on an address constant in the program 80. The record 220 includes a first field 222 indicating the ESDID of the referenced symbol, or R-pointer; a second field 224 indicating the reference type of the referenced symbol; a third field 225 indicating the ESDID of the control section containing the address constant in program 80, referred to as a P-pointer; a fourth field 226 indicating a location of the address constant in the section of the program designated by the P-pointer and its length; a fifth field 228 indicating fixed attribute information declared for the address constant; and a sixth field 230 providing the ESDID and offset of the extended attribute data for the address constant.

In this way, the RLD and ESD in the preferred embodiments include information to locate extended and fixed attribute declarations for symbols and address constants in a program.

Signature Checking

Figure 6:
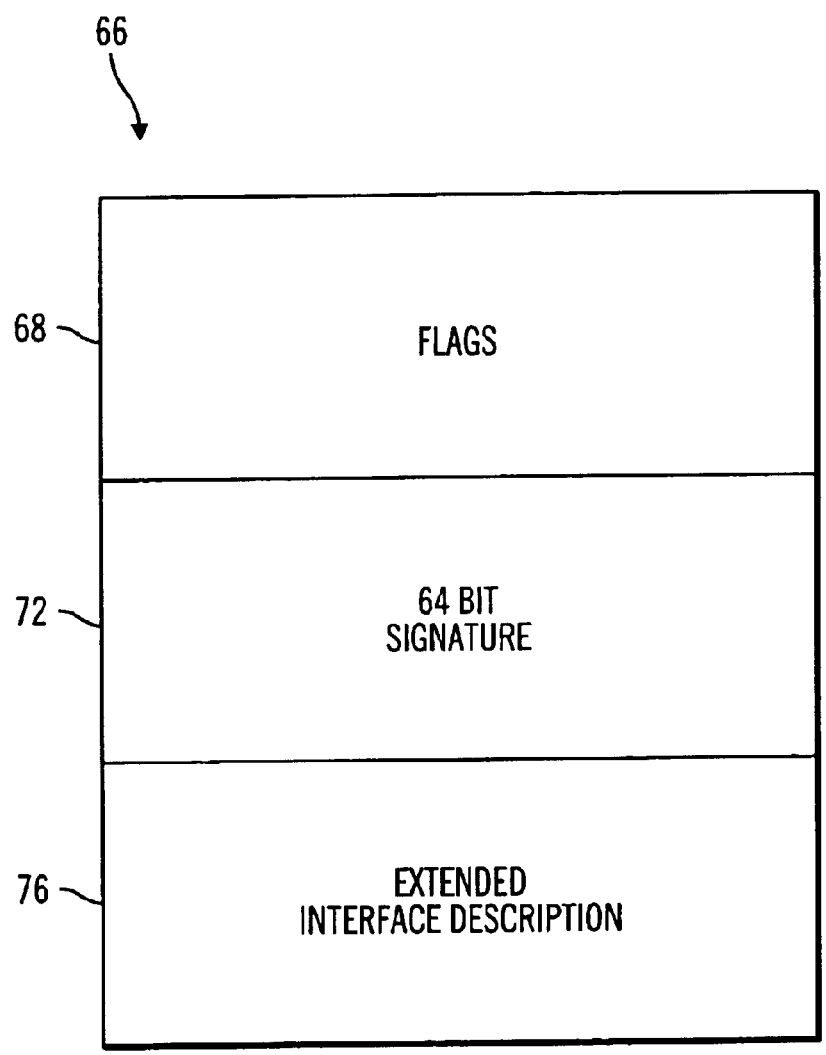
FIG. 6 is a block diagram of signature information in accordance with preferred embodiments of the present invention.

FIG. 6 shows a preferred embodiment of the data structure of an element 66 including extended attribute information fields. A set of flag bytes 68 would indicate specific conditions. A 64 bit signature 72 block could include descriptive information on the argument parameters of an external symbol or address constant, such as the number of parameters and the parameter attributes. Certain of this descriptive information could be contained in the first four bytes of the signature block 72, and other information in the next four bytes or any other portions thereof. This descriptive information in the signature block 72 can be compressed into a hash code, wherein the descriptive information is represented as a random number used in checking procedures described below. Including binary zero in the first four or second four bytes of the signature block 72 could signify that any type of referenced symbol or text is acceptable to the external symbol, address constant or procedure making the reference.

Figure 7:
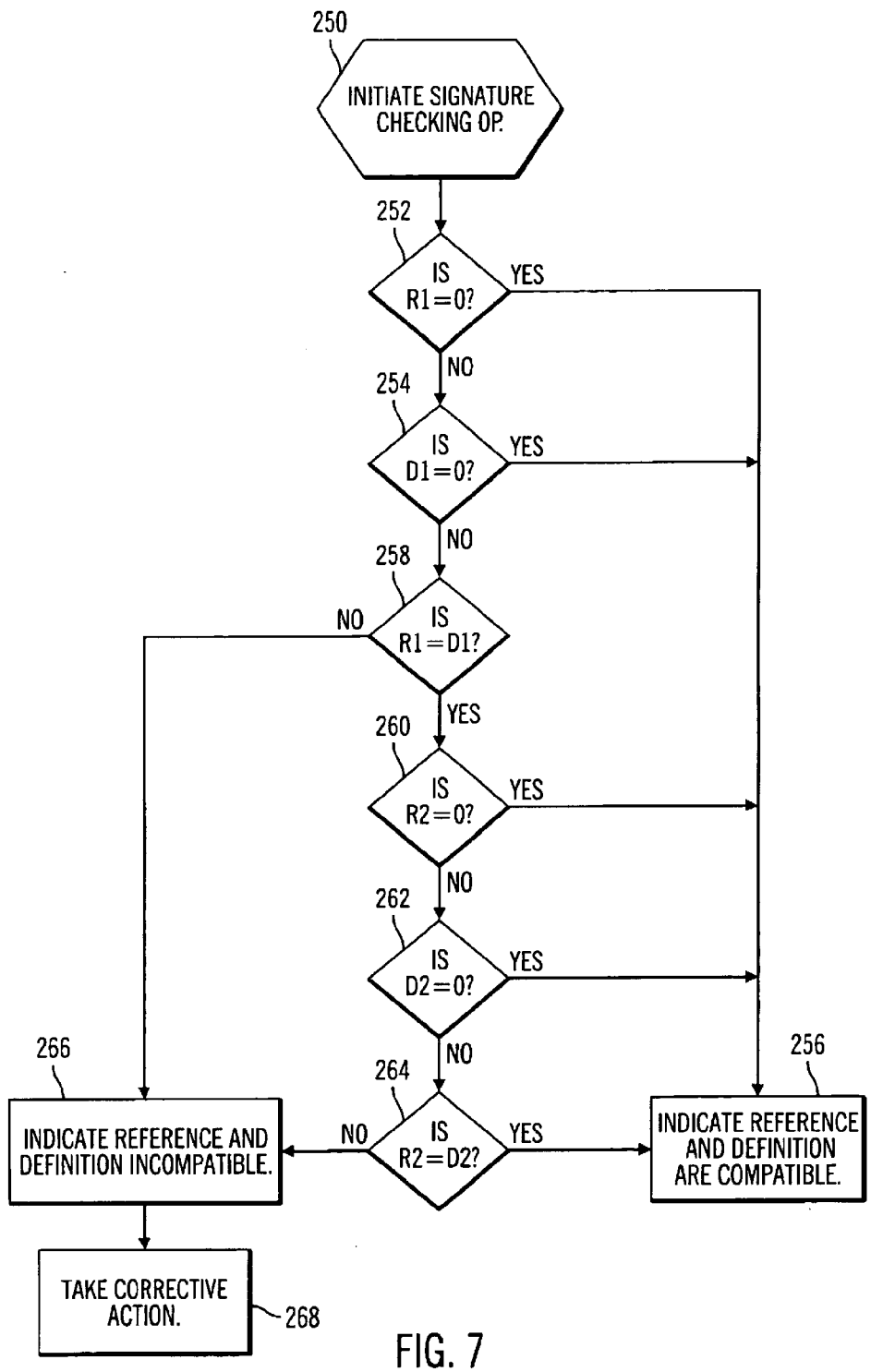
FIG. 7 is a flowchart illustrating logic for fast compatibility checking in accordance with preferred embodiments of the present invention.
Figure 8:
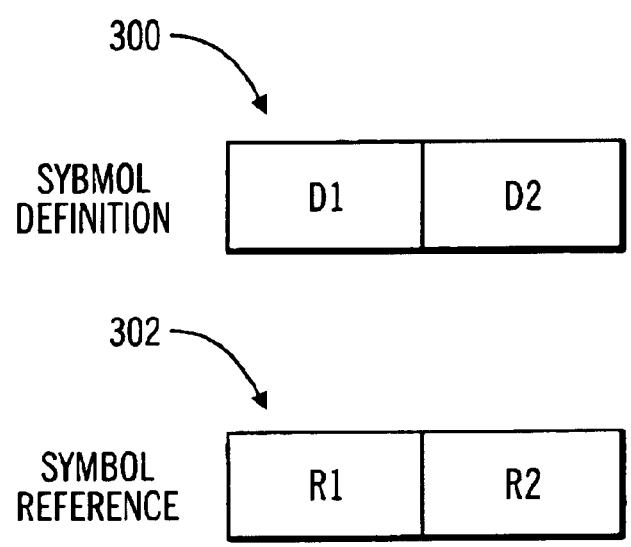
FIG. 8 is a block diagram of the symbol reference and definition information used in compatibility checking.

A third block 76 of the extended attribute information contains further descriptive information on the external symbol used for interface checking and diagnostics. A signature field may be associated with a symbol reference and definition and may be encoded as a hash code or series of bit flags. The signature field may include two 4 byte parts. The signature field may be created by the translator from internal data structures describing an interface, or by users. The signature fields need not provide anything specific about attribute information, only a quick check about the conformance of a reference and a definition. The signature may be a hash or encrypted form of much more extensive attribute information. In preferred embodiments, the signature is a short, compressed form of the totality of attribute data associated with the symbol or address constant FIG. 7 illustrates logic that could be implemented in the binder program 24 to process the signature information to perform a quick compatibility check of a symbol reference and definition. FIG. 8 illustrates that the symbol definition 300 signature information includes two blocks of data D1 and D2 and the symbol reference 302 signature information includes two blocks of data R1 and R2. In preferred embodiments, the binder program 24 uses the signature data for the symbol definition D1 and D2 and reference R1 and R2 to perform fast checking of the compatibility of symbol references and definitions during binding. During binding, the binder program 24 receives a plurality of object modules 20 and/or program objects 26 and initiates the process of binding them into a single program object 26. The binder program would initiate the signature checking routine at block 250 in FIG. 7 after locating an external symbol reference in one object module or program object that matches a symbol definition in another.

After locating a reference and definition, the binder program 24 determines (at block 252) whether R1 is zero. If so, the binder program 24 indicates (at block 256) that the symbol reference and definition are compatible. In alternative embodiments, a zero value for R1 may also indicate incompatibility. Otherwise, the binder program 24 determines (at block 254) if D1 is zero. If so, compatibility is indicated (at block 256). If D1 is not zero, then the binder program determines (at block 258) if D1 equals R1. If not, the binder program 24 indicates (at block 266) that the symbol reference and definition are incompatible. If R1 equals D1, then the binder program 24 determines (at block 260) whether R2 is zero. If so, compatibility is indicated (at block 256); otherwise, the binder program 24 determines (at block 260) if R2 is zero. If so, compatibility is indicated; otherwise, the binder program 24 determines if D2 is zero. If so, compatibility is indicated; otherwise the binder program 24 determines (at block 264) whether R2 equals D2. If so, compatibility is indicated at block 256; otherwise, the binder program indicates (at block 266) that the symbol reference and definition are incompatible. After determining incompatibility, the binder program 24 may enter a diagnostic mode or take further corrective action (at block 268); perhaps by examining the extended attribute information to locate the cause of incompatibility at a lower level of detail.

For instance, in a diagnostic mode (at block 268), the binder 24 can issue the user a detailed diagnostic message based on extended attribute information to determine the basis for the incompatibility. The programmer could then use this information to eliminate the cause of incompatibility in the source code 16. Alternatively, the binder 24, based on the extended attribute information, can prompt the user to take specific actions to fix the incompatibility problem. The third possibility is for the binder program 24 to present extended attribute information to an exit routine predefined by the user. This exit routine would determine how to diagnose and debug the incompatibility. The exit routine could correct the incompatibility to allow the external reference symbol to reference the external name symbol and associated text.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

For example, any type of computer, such as a mainframe, minicomputer, work station or personal computer, could be used with the present invention.

In addition, any operating system including a compiler, assembler, linking editor, and loader programs, if these other programs use different linking and loading interface conventions, could benefit from the present invention. Still further, in alternative embodiments, the extended attribute information may include different information, data structures, attributes, and parameters from the extended attribute information and data structures of the preferred embodiments.

Preferred embodiments described above include separate programs for translating, linking (binding), and loading. However, it should be appreciated that in alternative embodiments the functions performed by these separate program categories may be grouped in one or more programs in a manner different from the grouping of functions discussed above.

Preferred embodiments discussed above also describe certain operations occurring at certain times. For instance, external symbols are resolved during binding and address constants are relocated during binding. However, it should be appreciated that in alternative embodiments these operations, resolving external symbols and relocating address constants, may occur during load time when the program fetch 28 program loads the text from the program objects into the memory, during program execution, or at some other time during the process of translating the source code to machine executable code loaded into the memory.

Preferred embodiments described specific assembly language statements and data structures for utilizing the extended attribute information feature. Those skilled in the art will appreciate that alternative translation techniques, command language and data structures or records may be used to accomplish the results of the preferred embodiments.

In summary, disclosed is a system, method, and program for producing an executable file for execution by a computer. The computer receives a plurality of pro ng language statements comprising a source program and translates the source program into an object module. The object module is capable of including: a symbol reference; a symbol definition; attribute information for the symbol reference derived from the language statements; and attribute information for the symbol definition derived from the language statements. The computer binds the object modules into a program object and resolves in the program object an external symbol reference in the object module with an external symbol definition in another object module. The attribute information is available when binding object modules into the program object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of producing an executable file for execution by a computer, comprising:
receiving a plurality of programming language statements comprising a source program into the computer, wherein the language statements include declarations defining attribute information for a symbol reference or symbol definition;
translating the source program wherein the object module includes a symbol reference, a symbol definition, attribute information for the symbol reference derived from the language statements declaring the attribute information, and attribute information for the symbol definition derived from the language statements declaring the attribute information; wherein the object module is capable of including: a symbol reference; a symbol definition; attribute information for the symbol reference derived from the language statements declaring the attribute information; and attribute information for the symbol definition derived from the language statements declaring the attribute information;
binding object modules into a program object, wherein the attribute information is available when binding object modules into the program object; and
resolving in the program object an external symbol reference in the object module with an external symbol definition in another object module.

2. The method of claim 1, wherein the language statement is capable of indirectly declaring extended attribute information defined in another location in the object module.

3. The method of claim 1, wherein the object module is further capable of including fixed attribute information derived from language statements declaring attribute information for the symbol reference and symbol definition.

4. The method of claim 1, wherein the attribute information is extended attribute information.

5. The method of claim 1, wherein the object module is further capable of including an address constant for a symbol referenced in the module and attribute information derived from language statements declaring attribute information for the address constant.

6. The method of claim 5, wherein the object module is further capable of including additional address constants for additional references to the symbol reference in the object module and different attribute information sets for the address constants for the additional references.

7. The method of claim 6, wherein resolving the symbol reference and definition further comprises performing a compatibility check using the attribute information, wherein a separate compatibility check is performed for each reference to a symbol for which there is a separate address constant and separate attribute information for each address constant.

8. The method of claim 1, wherein the object module further includes an External Symbol Directory (ESD) including a record capable of indicating a symbol in the program, a location of the symbol in the program, and a pointer to attribute information in the program for the symbol.

9. The method of claim 1, wherein the object module further includes a Relocation List Directory (RLD) including a record capable of indicating the location of the referenced symbol, a location of an address constant for the referenced symbol in the program, and a pointer to attribute information for the address constant in the program.

10. The method of claim 1, wherein resolving the symbol reference and definition further comprises performing a compatibility check using signature data for the symbol definition and symbol reference.

11. The method of claim 10, further comprising determining whether the compatibility check failed and processing the attribute information declared for the symbol reference and definition that failed the compatibility check to determine a cause of the incompatibility.

12. The method of claim 1, wherein the attribute information describes whether the symbol definition or symbol reference is to data or executable code.

13. The method of claim 12, wherein the attribute information indicates data types and structures if the symbol definition or symbol reference is for data and indicates a number and types of arguments passed or received if the symbol definition or symbol reference is for executable code.

14. A system for producing an executable file, comprising:
   a computer;
   program logic executed by the computer, comprising:
   (i) means for receiving a plurality of programming language statements comprising a source program into the computer, wherein the language statements include declarations defining attribute information for a symbol reference or a symbol definition;
   (ii) means for translating the source program wherein the object module includes a symbol reference, a symbol definition, attribute information for the symbol reference derived from the language statements declaring the attribute information, and attribute information for the symbol definition derived from the language statements declaring the attribute information; wherein the object module is capable of including: a symbol reference; a symbol definition; attribute information for the symbol reference derived from the language statements declaring the attribute information; and attribute information for the symbol definition derived from the language statements declaring the attribute information;
   (iii) binding object modules into a program object, wherein the attribute information is available when binding object modules into the program object; and
   (iv) means for resolving in the program object an external symbol reference in the object module with an external symbol definition in another object module.

15. The system of claim 14, wherein the language statement is capable of indirectly declaring extended attribute information defined in another location in the object module.

16. The system of claim 14, wherein the object module is further capable of including fixed attribute information derived from language statements declaring attribute information for the symbol reference and symbol definition.

17. The system of claim 14, wherein the attribute information is extended attribute information.

18. The system of claim 14, wherein the object module is further capable of including an address constant for a symbol referenced in the module and attribute information derived from language statements declaring attribute information for the address constant.

19. The system of claim 18, wherein the object module is further capable of including additional address constants for additional references to the symbol reference in the object module and different attribute information sets for the address constants for the additional references.

20. The system of claim 19, wherein resolving the symbol reference and definition further comprises performing a compatibility check using the attribute information, wherein a separate compatibility check is performed for each reference to a symbol for which there is a separate address constant and separate attribute information for each address constant.

21. The system of claim 14, wherein the object module further includes an External Symbol Directory (ESD) including a record capable of indicating a symbol in the program, a location of the symbol in the program, and a pointer to attribute information in the program for the symbol.

22. The system of claim 14, wherein the object module further includes a Relocation List Directory (RLD) including a record capable of indicating the location of the referenced symbol, a location of an address constant for the referenced symbol in the program, and a pointer to attribute information for the address constant in the program.

23. The system of claim 14, wherein resolving the symbol reference and definition further comprises performing a compatibility check using signature data for the symbol definition and symbol reference.

24. The system of claim 23, further comprising determining whether the compatibility check failed and processing the attribute information declared for the symbol reference and definition that failed the compatibility check to determine a cause of the incompatibility.

25. The system of claim 14, wherein the attribute information describes whether the symbol definition or symbol reference is to data or executable code.

26. The system of claim 25, wherein the attribute information indicates data types and structures if the symbol definition or symbol reference is for data and indicates a number and types of arguments passed or received if the symbol definition or symbol reference is for executable code.

27. An article of manufacture for producing an executable file for execution by a computer, the article of manufacture comprising computer usable media including at least one computer program embedded therein that is capable of causing a computer to perform:
   receiving a plurality of programming language statements comprising a source program into the computer, wherein the language statements include declarations defining attribute information for a symbol reference or a symbol definition;
   translating the source program wherein the object module includes a symbol reference, a symbol definition, attribute information for the symbol reference derived from the language statements declaring the attribute information, and attribute information for the symbol definition derived from the language statements declaring the attribute information; wherein the object module is capable of including: a symbol reference; a symbol definition; attribute information for the symbol reference derived from the language statements declaring the attribute information; and attribute information for the symbol definition derived from the language statements declaring the attribute information;
   binding object modules into a program object, wherein the attribute information is available when binding object modules into the program object; and
   resolving in the program object an external symbol reference in the object module with an external symbol definition in another object module.

28. The article of manufacture of claim 27, wherein the language statement is capable of indirectly declaring extended attribute information defined in another location in the object module.

29. The article of manufacture of claim 27, wherein the object module is further capable of including fixed attribute information derived from language statements declaring attribute information for the symbol reference and symbol definition.

30. The article of manufacture of claim 27, wherein the attribute information is extended attribute information.

31. The article of manufacture of claim 27, wherein the object module is further capable of including an address constant for a symbol referenced in the module and attribute information derived from language statements declaring attribute information for the address constant.

32. The article of manufacture of claim 31, wherein the object module is further capable of including additional address constants for additional references to the symbol reference in the object module and different attribute information sets for the address constants for the additional references.

33. The article of manufacture of claim 32, wherein resolving the symbol reference and definition further comprises performing a compatibility check using the attribute information, wherein a separate compatibility check is performed for each reference to a symbol for which there is a separate address constant and separate attribute information for each address constant.

34. The article of manufacture of claim 27, wherein the object module further includes an External Symbol Directory (ESD) including a record capable of indicating a symbol in the program, a location of the symbol in the program, and a pointer to attribute information in the program for the symbol.

35. The article of manufacture of claim 27, wherein the object module further includes a Relocation List Directory (RLD) including a record capable of indicating the location of the referenced symbol, a location of an address constant for the referenced symbol in the program, and a pointer to attribute information for the address constant in the program.

36. The article of manufacture of claim 27, wherein resolving the symbol reference and definition further comprises performing a compatibility check using signature data for the symbol definition and symbol reference.

37. The article of manufacture of claim 36, further comprising determining whether the compatibility check failed and processing the attribute information declared for the symbol reference and definition that failed the compatibility check to determine a cause of the incompatibility.

38. The article of manufacture of claim 27, wherein the attribute information describes whether the symbol definition or symbol reference is to data or executable code.

39. The article of manufacture of claim 38, wherein the attribute information indicates data types and structures if the symbol definition or symbol reference is for data and indicates a number and types of arguments passed or received if the symbol definition or symbol reference is for executable code.

* * * * *

UNITED STATES PATENT AND TRADEMARK OFFICE
CERTIFICATE OF CORRECTION

| | |
|---|---|
| PATENT NO. | : 6,845,502 B1 |
| APPLICATION NO. | : 09/557633 |
| DATED | : January 18, 2005 |
| INVENTOR(S) | : Leona Dryden Baumgart, John Robert Ehrman and Richard E. Lee |

It is certified that error appears in the above-identified patent and that said Letters Patent is hereby corrected as shown below:

Column 12
Claim 1, lines 7-13, delete "wherein the object module … declaring the attribute information;"

Column 13
Claim 14, lines 21-27, delete "wherein the object module … declaring the attribute information;"

Column 14
Claim 27, lines 39-45, delete "wherein the object module … declaring the attribute information;"

Signed and Sealed this

Nineteenth Day of December, 2006

JON W. DUDAS
*Director of the United States Patent and Trademark Office*